United States Patent
Dong et al.

(10) Patent No.: US 11,056,772 B2
(45) Date of Patent: Jul. 6, 2021

(54) ANTENNA SYSTEM WITH DECREASED SAR VALUE

(71) Applicant: AAC Technologies Pte. Ltd., Singapore (SG)

(72) Inventors: Kai Dong, Shenzhen (CN); Dawei Shi, Shenzhen (CN)

(73) Assignee: AAC Technologies Pte. Ltd., Singapore (SG)

(*) Notice: Subject to any disclaimer, the term of this patent is extended or adjusted under 35 U.S.C. 154(b) by 55 days.

(21) Appl. No.: 16/439,723

(22) Filed: Jun. 13, 2019

(65) Prior Publication Data
US 2019/0386382 A1    Dec. 19, 2019

(30) Foreign Application Priority Data
Jun. 13, 2018  (CN) .......................... 201810604287.7

(51) Int. Cl.
*H01Q 1/24*      (2006.01)
*H01Q 1/50*      (2006.01)
*H04B 1/3827*    (2015.01)

(52) U.S. Cl.
CPC .............. *H01Q 1/245* (2013.01); *H01Q 1/50* (2013.01); *H04B 1/3838* (2013.01)

(58) Field of Classification Search
CPC ......... H01Q 1/245; H01Q 1/50; H04B 1/3838
See application file for complete search history.

(56) References Cited

U.S. PATENT DOCUMENTS 9,608,331 B1* 3/2017 Rowson ............... H01Q 9/0442

FOREIGN PATENT DOCUMENTS

| CN | 104979616 A1 | 10/2015 |
| CN | 108110407 A1 | 6/2018 |

OTHER PUBLICATIONS

1st Office Action dated Dec. 10, 2019 by SIPO in related Chinese Patent Application No. 201810604287.7 (8 Pages).

* cited by examiner

*Primary Examiner* — Robert Karacsony
(74) *Attorney, Agent, or Firm* — W&G Law Group LLP

(57) ABSTRACT

The present disclosure discloses an antenna system with decreased SAR. The antenna system includes a circuit board having a feeding point, an RF switch for making the antenna system work under a number of working modes with different frequency bands, and a system ground. The antenna further includes a radiation body including a feeding portion electrically connected to the feeding point, a ground portion connected to the system ground by the RF switch, and a connecting portion connecting the feeding portion to the ground portion. The ground portion includes a first metal segment for connecting to the connecting portion, and a second metal segment; the feeding portion includes a third metal segment and a fourth segment. The RF switch electrically connects to the second metal segment, and the feeding point electrically connects to the fourth segment. A method for decreasing the SAR value is also provide.

1 Claim, 2 Drawing Sheets

ANTENNA SYSTEM WITH DECREASED SAR VALUE

FIELD OF THE PRESENT DISCLOSURE

The present disclosure relates to the field of communication technologies, and more particularly to an antenna system with decreased SAR value. The present disclosure also related to a controlling method for decreasing the SAR value of the antenna system.

DESCRIPTION OF RELATED ART

With development of communication technologies, portable devices like tablets, laptops, mobile phones, are widely used. These devices are equipped with communication functions to communicate remotely with other ends. Antennas are more and more widely used to achieve such functions. An antenna is used for receiving electromagnetic waves and transmitting electromagnetic waves. Accordingly, users suffer the radiation of the electromagnetic waves, which is harmful to the users' health. In order to limit the radiation of the electromagnetic waves, a value named "Specific Absorption Rate" (SAR) is defined to measure the degree of the radiation from the electromagnetic waves. The smaller the value is, the lower the degree of harm is. The unit of SAR is mw/g. At present, two standards are applied, one of which is CE standard with SAR value not greater than 2 mw/g, and another of which is FFC standard with SAR value not greater than 1.6 mw/g.

All electronic devices with communication functions must be qualified for the standards. It's harder and harder to decrease the SAR value, and the balance between lower SAR and more powerful power of the antenna is harder to be achieved.

Therefore, an antenna system with decreased SAR is desired to solve the problems mentioned above, and a method to decrease the SAR is also desired.

SUMMARY OF THE PRESENT DISCLOSURE

One of the primary objects of the present disclosure is to provide an antenna system with deceased SAR value. And further, the present disclosure is to provide a method to decrease SAR value of an antenna system.

In order to achieve the objects above, the present disclosure provides an antenna system with decreased SAR. The antenna system includes a circuit board having a feeding point, an RF switch for making the antenna system work under a plurality of working modes with different frequency bands, and a system ground. The antenna system further includes a radiation body including a feeding portion electrically connected to the feeding point, a ground portion connected to the system ground by the RF switch, and a connecting portion connecting the feeding portion to the ground portion. The ground portion includes a first half-sealed space formed by extending counterclockwise from an end of the connecting portion; the feeding portion includes a second half-sealed space formed by extending clockwise from another end of the connecting portion. The ground portion includes a first metal segment at a starting end thereof for connecting to the connecting portion, and a second metal segment at an ending point thereof. The feeding portion includes a third metal segment at a starting point thereof and a fourth segment at an ending point thereof. The RF switch electrically connects to the second metal segment, and the feeding point electrically connects to the fourth segment.

Further, the RF switch includes a controlling chip and a plurality of peripheral circuits controlled by the controlling chip, and the antenna system connects to the system ground via one of the peripheral circuits.

Further, the peripheral circuit includes components connected in serial or in parallel, the components include at least inductance component, capacitor component, or resistance component.

The present disclosure further provides a method for controlling SAR value of an antenna system, including steps as:

(a) providing an antenna system;

(b) when the antenna system works under one of the modes, adjusting topological structure of the peripheral circuit and values of the corresponding component, measuring the reflection coefficient curve of the antenna system and making a trapped wave of the reflection coefficient curve close to a center frequency of a predetermined working frequency band;

(c) adjusting values of the components of the peripheral circuit, and making the trapped wave of the reflection coefficient curve move toward lower frequency or higher frequency; measuring radiation performance with SAR, and determining the values of the components when the radiation performance and SAR satisfies predetermined requirements;

(d) repeating the steps (b) (c) when the antenna system works under another mode.

The antenna system in the present disclosure include an RF switch to control the working frequency and by adjusting the peripheral circuits to make the trapped wave away from the center frequency, thereby obtaining greater radiation power and lower SAR value.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
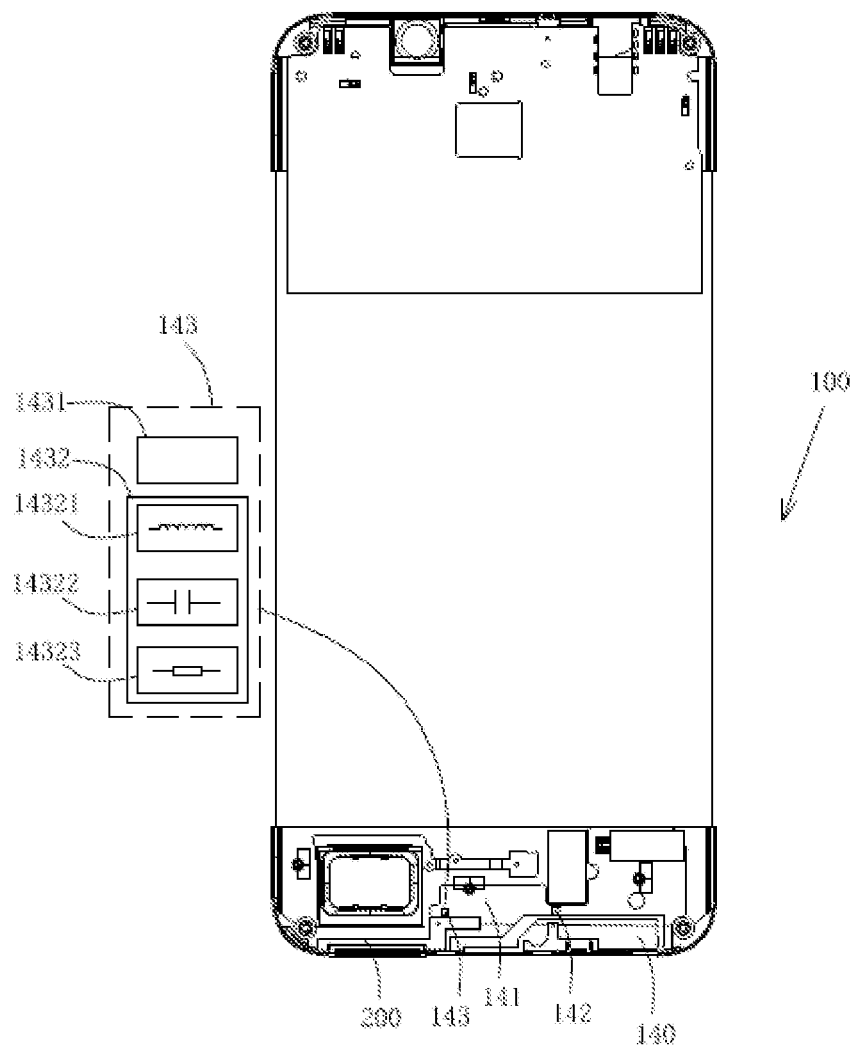
FIG. 1 is an illustrative structural view of an antenna system in accordance with an exemplary embodiment of the present disclosure.
Figure 2:
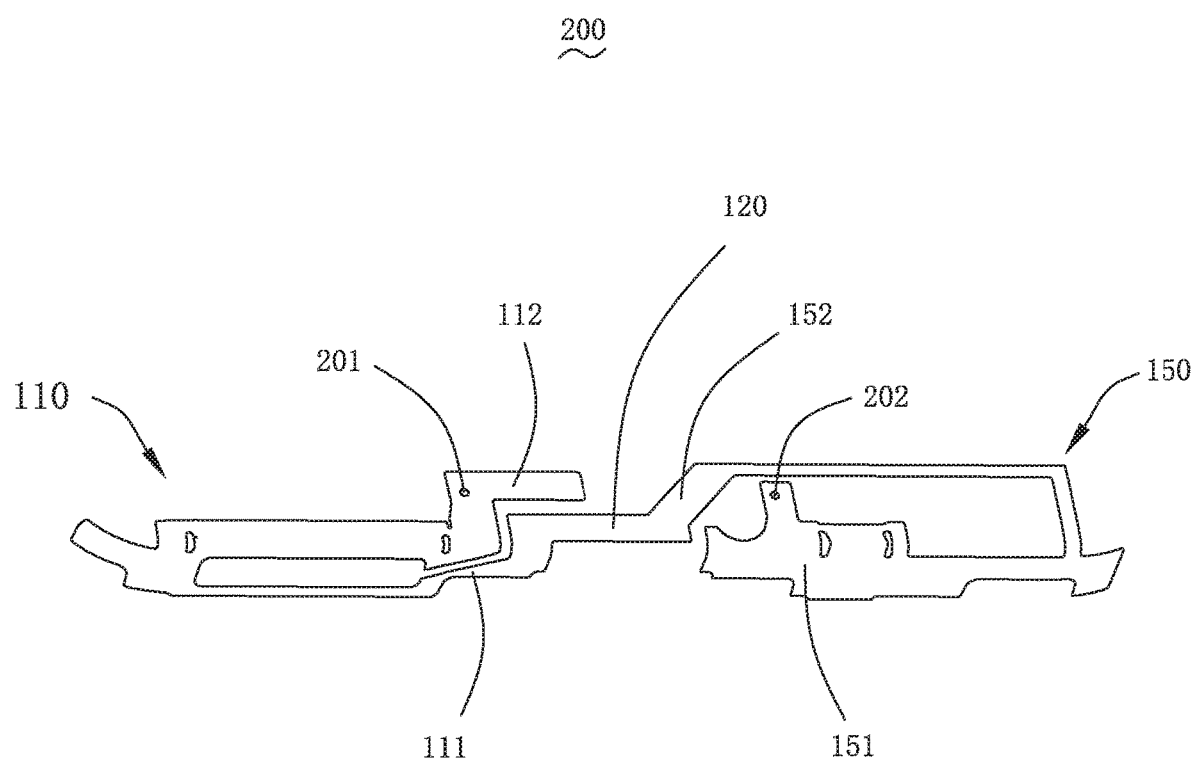
FIG. 2 is an isometric view of a radiation body of the antenna system in FIG. 1.

Referring to FIGS. 1-2, an antenna in accordance with an exemplary embodiment of the present disclosure will be described in detail. In the description below, the words, such as "up", "down", "low", "left", "right", "clockwise", "counterclockwise" reflect the directions only shown or indicated in the figures, not meaning to limit the actual directions in a real antenna system.

Referring to FIGS. 1-2, an antenna system with decreased SAR in accordance with an exemplary embodiment of the present disclosure is equipped with a portable device 100. The antenna system includes a radiation body 200 and a circuit board 140. The circuit board 140 includes a feeding point 142, an RF switch 143, and a system ground 141. The radiation body 200 further includes a feeding portion 150 electrically connected to the feeding point 142, a ground portion 110 electrically connected to the system ground 141, and a connecting portion 120 connecting the feeding portion 150 and the ground portion 110. The ground portion 110 electrically connects to the system ground 141 by the RF switch 143. The ground portion 110 includes a first half-sealed space formed by extending counterclockwise from an end of the connecting portion 120. The feeding portion 150 includes a second half-sealed space formed by extending clockwise from another end of the connecting portion 120. The ground portion 110 includes a first metal segment 111 at a starting end thereof for connecting to the connecting portion 120, and a second metal segment 112 at an ending point thereof. In addition, the feeding portion includes a third metal segment 152 at a starting point thereof and a fourth segment 151 at an ending point thereof. The second metal segment includes a first connecting point 201, and the fourth metal segment includes a second connecting point 202. The RF switch 143 is connected to the second metal segment 112 via the first connecting point 201, and the feeding point 142 connects to the fourth metal segment 151 via the second connecting point 202.

In the embodiment, the radiation body is formed by Laser Direct Structuring (LDS) process using LDS materials. LDS material is an improved plastic material containing organic metal compounds. After being processed by laser, the organic metal compounds will release metal particles. By LDS process, a circuit board formed on the LDS material by laser can serve as an antenna used in a portable device.

The antenna system is workable under several modes by switching the RF switch 143, and the antenna system works at different frequency bands under different modes.

In the embodiment, the RF switch 143 includes a controlling chip 1431 and a plurality of peripheral circuits 1432. The antenna system connects to the system ground through one of the peripheral circuits 1432 under each mode.

Each of the peripheral circuits 1432 include components connected in serial or in parallel. The components include at least inductance component 14321, capacitor component 14322, or resistance component 14323.

The present disclosure further provides a method to control SAR value of the antenna system, and the method comprises steps as:

(a) providing an antenna system as described above;

(b) when the antenna system works under one of the modes, adjusting topological structure of the peripheral circuit and values of the corresponding component, measuring the reflection coefficient curve of the antenna system and making a trapped wave of the reflection coefficient curve close to a center frequency of a predetermined working frequency band;

(c) adjusting values of the components of the peripheral circuit, and making the trapped wave of the reflection coefficient curve move toward lower frequency or higher frequency; measuring radiation performance with SAR, and determining the values of the components when the radiation performance and SAR satisfies predetermined requirements;

(d) repeating the steps above when the antenna system works under another mode.

Specifically, in step (b), the mode under which the antenna system works need to be confirmed, and then topological structure of the peripheral circuit and values of the corresponding component are adjusted for making the trapped wave of the reflection coefficient curve close to the center frequency of the predetermined working frequency band.

In a detailed method, the antenna system connects to the system ground via the peripheral circuit and works at Frequency W2. The capacitor value is selected to be 1.2 pF. Adjust the capacitor value to make the trapped wave of the reflection coefficient curve move toward lower frequency or higher frequency and monitor the SAR value. As shown in table 1, when the capacitor value is selected to be 1.2 pF and 3 pF, a difference value of total radiated powers (TRP) of frequency W2 is close, but the SAR value under 3 pF is obviously better than that under 1.2 pF. Thus, the capacitor value 3 pF is finally determined to be used in the peripheral circuit, by which, greater radiation power and lower SAR value are achieved.

TABLE 1

|  | RF2 1.2PF | | RF2 3PF | |
| --- | --- | --- | --- | --- |
|  | TRP (dbm) | 1 g bottom(W/KG) | TRP (dbm) | 1 g bottom(W/KG) |
| W2 | 17.78 | 2.43 | 19.21 | 1.51 |
|  | 19.22 | 3.00 | 18.13 | 1.24 |
|  | 18.77 | 2.84 | 17.34 | 0.89 |

Compared with prior antenna system, the antenna system in the present disclosure include an RF switch to control the working frequency and by adjusting the peripheral circuits to make the trapped wave away from the center frequency, thereby obtaining greater radiation power and lower SAR value.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A method for controlling SAR value of an antenna system, comprising steps as:

(a) providing an antenna system, the antenna system comprising:

a circuit board having a feeding point, an RF switch for making the antenna system work under a plurality of working modes with different frequency bands, and a system ground;

a radiation body including a feeding portion electrically connected to the feeding point, a ground portion connected to the system ground by the RF switch, and a connecting portion connecting the feeding portion to the ground portion;

the ground portion including a first half-sealed space formed by extending counterclockwise from an end of the connecting portion;

the feeding portion including a second half-sealed space formed by extending clockwise from another end of the connecting portion;

the ground portion including a first metal segment at a starting end thereof for connecting to the connecting portion, and a second metal segment at an ending point thereof;

the feeding portion including a third metal segment at a starting point thereof and a fourth segment at an ending point thereof;

the RF switch electrically connecting to the second metal segment, and the feeding point electrically connected to the fourth segment, wherein the RF switch includes a controlling chip and a plurality of peripheral circuits controlled by the controlling chip, and the antenna system connects to the system ground via one of the peripheral circuits, the peripheral circuit includes components connected in serial or in parallel, the components include at least inductance component, capacitor component, or resistance component;

(b) when the antenna system works under one of the modes, adjusting topological structure of the peripheral circuit and values of the corresponding component, measuring the reflection coefficient curve of the antenna system and making a trapped wave of the reflection coefficient curve close to a center frequency of a predetermined working frequency band;

(c) adjusting values of the components of the peripheral circuit, and making the trapped wave of the reflection coefficient curve move toward lower frequency or higher frequency; measuring radiation performance with SAR, and determining the values of the components when the radiation performance and SAR satisfies predetermined requirements;

(d) repeating the steps (b) (c) when the antenna system works under another mode.

* * * * *